United States Patent [19]

Stueber et al.

[11] Patent Number: 5,106,010

[45] Date of Patent: Apr. 21, 1992

[54] WELDING HIGH-STRENGTH NICKEL BASE SUPERALLOYS

[75] Inventors: Richard J. Stueber, Suffern; Thomas Milidantri, Monsey; Moshen Tadayon, Washingtonville, all of N.Y.

[73] Assignee: Chromalloy Gas Turbine Corporation, Orangeburg, N.Y.

[21] Appl. No.: 590,220

[22] Filed: Sep. 28, 1990

[51] Int. Cl.$^5$ .............................................. B23K 31/02
[52] U.S. Cl. .................. 228/232; 228/263.13
[58] Field of Search .............. 228/232, 263.13, 199, 228/119

[56] References Cited

U.S. PATENT DOCUMENTS

| | | | |
|---|---|---|---|
| 3,045,098 | 7/1962 | Norton | 219/19 |
| 3,103,065 | 9/1963 | Rectenwald | 29/401 |
| 3,125,804 | 3/1964 | Thome | 29/487 |
| 3,246,392 | 4/1966 | Altgelt | 29/402 |
| 3,506,251 | 4/1970 | Sampatacos | 266/4 |
| 3,660,882 | 5/1972 | Widowitz et al. | 29/156.8 B |
| 4,188,419 | 2/1980 | Detert et al. | 427/287 |
| 4,336,312 | 6/1982 | Clark et al. | 148/127 X |
| 4,611,744 | 9/1986 | Fraser et al. | 228/119 |
| 4,613,744 | 9/1986 | Fraser | 219/200 |
| 4,804,815 | 2/1989 | Everett | 427/53.1 X |
| 4,841,117 | 6/1989 | Koromzay | 219/76.1 |
| 4,878,953 | 11/1989 | Saltzman et al. | 148/903 X |

OTHER PUBLICATIONS

Ernest F. Nippes et al., "Welding, Brazing, and Soldering", ©1983, Metals Handbook Ninth Edition, vol. 6, American Society for Metals.

W. H. Kearns, "Metals and Their Weldability", Welding Handbook, Seventh Edition, vol. 4, American Welding Society, ©1982.

*Primary Examiner*—Richard K. Seidel
*Assistant Examiner*—Patty E. Hong
*Attorney, Agent, or Firm*—Mitchell D. Bittman

[57] ABSTRACT

A process is provided for welding a gamma-prime precipitation-strengthened nickel base superalloy by heating the weld area and adjacent region to a ductile temperature, welding while maintaining the entire weld area and adjacent region at the ductile temperature and holding the weldment, weld area and adjacent region at the ductile temperature until the entire weld has solidified. The ductile temperature is above the aging temperature but below the incipient melting temperatures of the superalloy.

18 Claims, 2 Drawing Sheets

WELDING HIGH-STRENGTH NICKEL BASE SUPERALLOYS

BACKGROUND OF THE INVENTION

The development of the gas turbine engine into the fuel-efficient, durable, high-powered propulsion engine as used on today's aircraft has depended to a large extent on the development of high strength nickel-based superalloys for the fabrication of hot-section turbine components. Such superalloys whether they be polycrystalline, directionally solidified or monocrystalline exhibit creep, stress-rupture and tensile strength properties superior to those of the earlier generation of nickel-based alloys. However, these superalloys generally have very poor ductility, and are difficult to cast or fabricate into engine components.

Production of turbine engine hot-section components from the new generation of superalloys is characterized by low yield and gross inefficiencies in the casting/fabrication process, thereby creating high part prices accompanied by routine shortages. In past years when turbine operators had been confronted with this dilemma in the operation and maintenance of their equipment, operators would be able to seek economy and parts supply through repair of the components. This approach was very successful until the advent of the new class of superalloys and their inherent high strength, low ductility properties which confounded the existing repair and restoration schemes. When castings or engine-run parts of these new superalloys are welded, cracks are induced which propagate rapidly under stress. These superalloys are principally strengthened through controlled heat treatment producing $Ni_3Al$ or $Ni_3Ti$ precipitates known as gamma-prime. The precipitation hardening phenomena and the associated volumetric changes that occur upon aging facilitates cracking and makes welding of these alloys very difficult.

Upon welding, a portion of the heat affected zone is heated into the precipitation hardening temperature range and undergoes a volumetric contraction resulting in residual stress in the weldment upon solidification, accompanied by a loss in ductility. Rapid heat-up and cool-down from welding temperatures produces complicated thermal expansion and contraction, leading to additional residual stress. These thermal stresses, when combined with previous stresses produced from the aging reaction, can result in cracking. This cracking, or fissuring, is often located in the heat affected zone. The heat affected zone is also subject to grain growth or even localized melting that makes the weld zone even more susceptible to cracking. Post weld solution annealing and/or aging heat treatments can further increase susceptibility to cracking.

Although substantial progress in brazing technology has been achieved, no substitute for the weld repair of cracks in highly stressed structural details or sealing surfaces has been discovered.

SUMMARY OF THE INVENTION

Briefly, this invention provides a process for crack-free welding of an article comprised of a gamma prime precipitation-strengthened nickel base superalloy by: heating the entire weld area and region adjacent to the weld area to a ductile temperature; then welding the entire weld area while maintaining the entire weld area and adjacent region at the ductile temperature; and holding the weld, the entire weld area and adjacent region at the ductile temperature until the weld has solidified. The ductile temperature is a temperature above the aging temperature and below the incipient melting temperature for said superalloy.

DETAILED DESCRIPTION OF THE INVENTION

Figure 1:
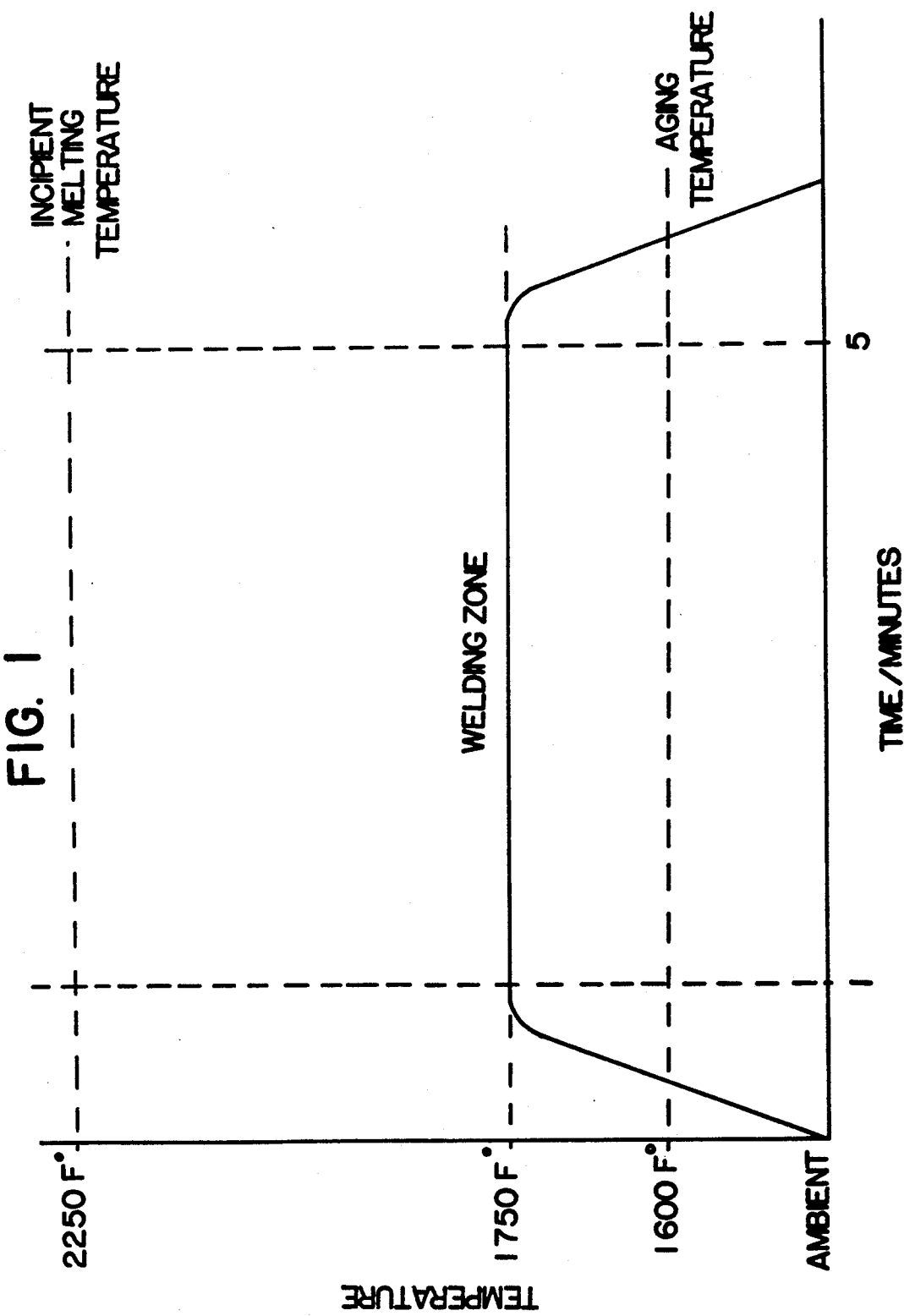
FIG. 1 shows temperature over time of welding the sample of Example I.

Gamma prime precipitation strengthened nickel base superalloys are susceptible to strain age cracking as a result of welding. The difficulty in welding generally increases with increasing aluminum and titanium content. This invention provides a process for welding gamma prime precipitation-strengthened superalloys which contain titanium and aluminum in a combined amount of at least about 5%, preferably 6–12%, and containing chromium in an amount up to about 20%, preferably 7–17%. These superalloys also may contain metals such as tungsten, molybdenum, cobalt and tantalum and may contain other elements such as carbon, boron, zirconium and hafnium. In particular, a welding process is provided for high strength superalloys. The following AISI alloy designations or brand names are typical examples of the new generation of high strength precipitation strengthened nickel base superalloys: Mar-M247, IN100, IN738, IN792, Mar-M 200, B1900, RENE 80, Alloy 713 and their derivatives. These alloys are difficult to cast and machine, and crack readily during welding even when welded in the solution heat treated and over-aged condition.

The following Table I identifies nominal chemistry of some of these high strength precipitation strengthened nickel-based superalloys and also Waspaloy, a weld filler metal.

The high strength gamma prime precipitation-strengthened nickel base superalloys are generally described as those which exhibit high strength even at temperatures of 1600° F. or higher. Generally, these superalloys will have an ultimate tensile strength of at least 125 ksi at 1200° F. and at least 100 ksi at 1600° F., a yield strength at 0.2% offset of at least 100 ksi at 1200° F. and at least 70 ksi at 1600° F. and a rupture strength (1000-hr) of at least 25 ksi at 1600° F. (see SUPERALLOYS II, edited by Sims et al, John Wiley & Sons, 1987, pages 581–586).

Hot isothermal welding, utilizing an appropriate heating source such as induction, laser or resistance heating, remedies the difficulties encountered welding the gamma prime precipitation-strengthened nickel base superalloys and produces crack-free weldments. These superalloys can be welded crack-free by heating the entire weld area and region adjacent to the weld into the ductile temperature range, welding while the temperature of the entire weld area and adjacent region are maintained at the ductile temperature and holding the weldment, entire weld area and adjacent region at the ductile temperature during the course of solidification of the weldment, followed by cooling, then heat treating the welded alloy.

The ductile temperature to which the weld area of the article is heated is above the aging or precipitation hardening temperature, but below the incipient melting temperature of the particular superalloy article. The ductile temperature to which the article is heated will generally be within the temperature range of 1400° F. to 2000° F., preferably 1700° to 1800° F. Critical to this process is to maintain thermal equilibrium before, during and after the welding process, leading to less severe thermal gradients across the weld/adjacent base metal thus reducing residual stresses and subsequent cracking. The reduction of thermal gradients lessens the impact of the heat from welding on the heat affected zone, i.e. the process "relocates" the heat affected zone away from the fusion line.

The entire weld area and region adjacent to the weld are heated, e.g. by induction heating, to the ductile temperature. The region adjacent to the weld area being heated is at least sufficiently large to be able to encompass the heat affected zone, preferably larger. The heat affected zone is defined as that portion of the base metal which has not been melted, but whose mechanical properties or microstructure have been altered by the heat of welding (see Metals Handbook Ninth Edition, Volume 6, ASM, 1983). Generally, this adjacent region being heated is at least 0.25 inches preferably 0.5 to 1 inch from the weld In a preferred embodiment, the weld area and adjacent region is allowed to reach thermal equilibrium by holding at the prescribed ductile temperature for 3-5 minutes. The uniform preheat minimizes the formation of localized thermal stress gradients that can result from application of the focused heat from a welding torch, plasma needle-arc gun or laser. Application of the welding heat melts both the filler metal and adjacent base material, while the heat affected zone of the weldment is already above the aging temperature prior to welding as a result of the induction preheat. Since the entire weld area and adjacent region is preheated above the precipitation hardening temperature, this results in a uniform thermal distribution that precludes the contraction and resultant residual stresses that are normally focused at the weaker heat affected zone. The entire weld area and adjacent region undergoes thermal contraction as a result of the aging reaction with the residual stresses that result from this reaction being distributed over a much larger area, not only concentrated in the spot being welded.

As the weld heat is moved away from the weld, or along the weld joint, the solidified weld metal cools only to the ductile temperature of the entire weld area created by the induction heating. This means that the weld metal and surrounding base metal cools slowly, and reaches thermal equilibrium with the remainder of its surroundings. Thus, the weld reaches thermal equilibrium with the heated adjacent base material with a minimum of thermal stress build up. Upon completion of the weld, the joint and surrounding base material is allowed to reach equilibrium again by holding at the ductile temperature until the weld solidifies, generally at least 30 seconds and preferably 1-10 minutes after the weld is completed. The induction coil is then turned off and the entire weldment, which is now solidified, is cooled from the same temperature, allowing an even dissipation of otherwise damaging thermal stresses. To minimize thermal stress the cool down rate is preferably no greater than 40° F./minute. After the welded article is cooled it the is heat treated according to procedures prescribed for the particular superalloy.

The weld filler metal can be any suitable metal, preferably a gamma-prime precipitation hardenable nickel base alloy (e.g. Waspaloy), or even an alloy fabricated from the same high strength superalloy as that of the article being welded to produce crack-free weldments when welded by this process.

By using this process crack-free weldments are produced in the polycrystalline, directionally solidified and monocrystalline forms of these alloys. Uniquely, this process promotes the development of a directionally solidified weld microstructure in at least a portion (e.g. at least 25%) of the weld when the substrate alloy is directionally solidified which provides for a further strengthening of the weld at high temperature.

This process is suited to welding components of gas turbine engines which utilize the high strength superalloys, particularly turbine vanes, turbine blades and turbine rotors.

In the examples heat input to weld the articles for this process were supplied by induction heating with either manual or computer control of the required power setting. Induction electrodes were fabricated to conform intimately to the contour of the article being welded. All welding operations were performed either manually or by automated TIG (tungsten inert gas) welding in a purged and argon back filled enclosure. Optical pyrometers were used to measure and record sample and weldment temperatures during the process.

Example I

A one ounce sample of the superalloy Mar-M247, directionally solidified, was welded successfully at 1750° F. with the temperatures as shown in FIG. 1. The power input to the induction heater was reduced during welding to maintain the temperature of 1750° F.

The welded alloy was found to be crack-free.

Example II

Tips were hot welded onto directionally solidified Mar-M247 turbine blades in an effort to restore original equipment manufacturer (OEM) dimensions after machining.

Figure 2:
FIGS. 2 and 3 are photomicrographs showing a 100X magnification of a weldment pursuant to Example 2.
Figure 3:

The blades were stripped of a nickel aluminide coating and the blade tips were ground prior to welding. The stripped, ground blades were subjected to a 2230° F./2 hours solution heat treatment to make them less susceptible to cracking during welding. The blades were preheated to 1750° F., heating the entire weld area and a region at least 0.5 inches from the weld, then one set of blades were welded with Mar-M247 weld wire and another set of blades were welded with Waspaloy weld wire being deposited on the ground tip to build up material to be machined while maintaining the entire weld area and adjacent region at 1750° F. until 3 to 5 minutes after welding was completed. After the welding, the blade tips were cooled (at approximately 40° F./minute) and then ground and electro-discharge machined (EDM) to OEM dimensions. The blades were then subjected to a nickel aluminide pack coating process and an aging heat treatment (1600° F./20 hours when Mar-M247 wire was used and 1600° F./20 hours followed by 1400° F./16 hours when Waspaloy wire was used). Various sections of the blades were etched and inspected at 100x and 500x magnification and found to be free of any weld defects (i.e. cracks, cold shuts, porosity, lack of fusion, etc.). FIG. 2 shows a photomicrograph at 100x magnification of the weldment using Mar-M247 weld wire (weld on top) and FIG. 3 shows a photomicrograph at 100x magnification using Waspaloy weld wire (weld on top). Each of the microstructures shown in these photomicrographs shows a directionally solidified weld microstructure.

at 0.2% offset, of at least 100 ksi at 1200° F. and at least 70 ksi at 1600° F. and a rupture strength (1000-hr) of at least 25 ksi at 1600° F.

7. Process of claim 6 wherein the article is component of a gas turbine engine.

TABLE I

CHEMISTRY OF NICKEL BASE ALLOYS

| Alloy | Ni | Cr | Co | Mo | W | Ta | Cb | Al | Ti | C | B | Zr | Other | Density lb/in.$^3$ | g/cm$^3$ |
|---|---|---|---|---|---|---|---|---|---|---|---|---|---|---|---|
| Alloy 713C | 74 | 12.5 | 0.0 | 4.2 | 0.0 | 0.0 | 2.0 | 6.1 | 0.8 | 0.12 | 0.012 | 0.10 | | 0.286 | 7.9 |
| Alloy 713LC | 75 | 12.0 | 0.0 | 4.5 | 0.0 | 0.0 | 2.0 | 5.9 | 0.6 | 0.05 | 0.010 | 0.10 | | 0.289 | 8.0 |
| B-1900 | 64 | 8.0 | 10.0 | 6.0 | 0.0 | 4.0 | 0.0 | 6.0 | 1.0 | 0.10 | 0.015 | 0.10 | | 0.297 | 8.2 |
| IN-100 | 60 | 10.0 | 15.0 | 3.0 | 0.0 | 0.0 | 0.0 | 5.5 | 4.7 | 0.18 | 0.014 | 0.06 | 1.0 V | 0.280 | 7.7 |
| IN-738LC | 61 | 16.0 | 8.5 | 1.7 | 2.6 | 1.7 | 0.9 | 3.4 | 3.4 | 0.11 | 0.010 | 0.05 | | 0.283 | 8.1 |
| IN-792 | 61 | 12.4 | 9.0 | 1.9 | 3.8 | 3.9 | 0.0 | 3.1 | 4.5 | 0.12 | 0.020 | 0.10 | | 0.298 | 8.3 |
| PWA 1480 | 63 | 10.0 | 5.0 | 0.0 | 4.0 | 12.0 | 0.0 | 5.0 | 1.5 | 0.00 | 0.000 | 0.00 | | 0.313 | 8.7 |
| Rene 77 | 58 | 14.6 | 15.0 | 4.2 | 0.0 | 0.0 | 0.0 | 4.3 | 3.3 | 0.07 | 0.016 | 0.04 | | 0.286 | 7.9 |
| Rene 80 | 60 | 14.0 | 9.5 | 4.0 | 4.0 | 0.0 | 0.0 | 3.0 | 5.0 | 0.17 | 0.015 | 0.03 | | 0.295 | 8.2 |
| Waspaloy | Bal. | 19.5 | 10.0 | 4.25 | 0.0 | 0.0 | 0.0 | 1.25 | 3.0 | 0.07 | 0.005 | 0.00 | | 0.298 | — |
| Mar-M247 | Bal. | 8.4 | 10.0 | 0.65 | 10.0 | 3.1 | 0.0 | 5.5 | 1.1 | 0.15 | 0.015 | 0.055 | 1.4 HF | 0.311 | — |

What is claimed:

1. A process for welding an article comprised of a gamma-prime precipitation-strengthened nickel base superalloy containing titanium and aluminum in a combined amount of at least about 5% and chromium in an amount up to about 20% comprising:
heating the entire weld area and region adjacent to the weld of the article to a ductile temperature which is above the aging temperature and below the incipient melting temperature for said superalloy;
welding the entire weld area while maintaining the entire weld area and adjacent region at said ductile temperature;
holding the weldment, the entire weld area and adjacent region at said ductile temperature until the weld has solidified; and
cooling the welded article.

2. Process of claim 1 wherein the ductile temperature is within the range of from 1400° F. to 2000° F.

3. Process of claim 2 wherein the weld is carried out utilizing a gamma-prime precipitation-hardenable nickel base alloy as a filler metal.

4. Process of claim 3 wherein the weld is carried out utilizing the same nickel base superalloy for the filler metal as in the article.

5. Process of claim 1 wherein said nickel base superalloy additionally contains metals selected from the group consisting of tungsten, molybdenum, cobalt and tantalum.

6. Process of claim 5 wherein said nickel base superalloy has an ultimate tensile strength of at least 125 ksi at 1200° F. and at least 100 ksi at 1600° F., a yield strength 8. Process of claim 7 wherein the component is a turbine blade, turbine vane or turbine rotor.

9. Process of claim 8 wherein the ductile temperature is from 1700° F. to 1800° F.

10. Process of claim 9 wherein the weld area is held at the ductile temperature range for at least 30 seconds after the weld is completed.

11. Process of claim 9 wherein the weld area is held at the ductile temperature range of 1-10 minutes after the weld is completed.

12. Process of claim 10 wherein the adjacent region of the weld are extends at least 0.25 inches from the weld.

13. Process of claim 11 wherein the adjacent region of the weld area extends 0.5 to 1.0 inches from the weld.

14. Process of claim 13 wherein the welded article is cooled at a rate no greater than 40° F./minute.

15. Process of claim 7 wherein the component is a damaged component and the component is first stripped of any coating thereon, ground and cleaned prior to welding.

16. Process of claim 5 wherein the article comprises a superalloy containing 6 to 12% of titanium and aluminum and 7-17% chromium.

17. Process of claim 1 wherein the article comprises a superalloy with a microstructure selected from the group consisting of polycrystalline, directionally solidified and monocrystalline.

18. Process of claim 17 wherein the superalloy has a directionally solidified microstructure and at least a portion of the weld of the welded article has a directionally solidified microstructure.

* * * * *